(12) United States Patent
Yu et al.

(10) Patent No.: US 8,527,667 B2
(45) Date of Patent: Sep. 3, 2013

(54) APPARATUSES AND METHODS FOR TRANSFERRING DATA

(75) Inventors: Xiaoguang Yu, Wuhan (CN); Wei Yao, Wuhan (CN); Hongxiao Zhao, Wuhan (CN); Li Ren, Beijing (CN); Ren Fang, Wuhan (CN); Liang Tao, Wuhan (CN)

(73) Assignee: Maishi Electronic (Shanghai) Ltd, Shanghai (CN)

( * ) Notice: Subject to any disclaimer, the term of this patent is extended or adjusted under 35 U.S.C. 154(b) by 309 days.

(21) Appl. No.: 12/784,179

(22) Filed: May 20, 2010

(65) Prior Publication Data

US 2011/0125934 A1  May 26, 2011

Related U.S. Application Data

(63) Continuation-in-part of application No. 12/565,874, filed on Sep. 24, 2009.

(30) Foreign Application Priority Data

Apr. 19, 2010  (CN) .......................... 2010 1 0153027

(51) Int. Cl.
*G06F 3/00* (2006.01)
*G06F 13/36* (2006.01)

(52) U.S. Cl.
USPC .............. 710/14; 710/109; 710/308; 710/309

(58) Field of Classification Search
USPC .................................... 710/14, 109, 308, 309
See application file for complete search history.

(56) References Cited

U.S. PATENT DOCUMENTS

| | | | |
|---|---|---|---|
| 5,812,858 A * | 9/1998 | Nookala et al. | 710/260 |
| 5,986,677 A | 11/1999 | Jones et al. | |
| 7,136,950 B2 * | 11/2006 | Mowery et al. | 710/301 |
| 7,191,270 B2 * | 3/2007 | Oh et al. | 710/109 |
| 7,581,040 B2 * | 8/2009 | Irisawa | 710/33 |
| 2004/0049627 A1 | 3/2004 | Piau et al. | |
| 2005/0033917 A1 * | 2/2005 | Takeuchi | 711/115 |
| 2005/0065747 A1 | 3/2005 | Premy et al. | |
| 2007/0170255 A1 * | 7/2007 | Yoshida | 235/439 |
| 2007/0260838 A1 | 11/2007 | Schwemmlein | |
| 2009/0003569 A1 | 1/2009 | Forbes et al. | |
| 2009/0193161 A1 * | 7/2009 | Yoshida | 710/74 |
| 2011/0202701 A1 * | 8/2011 | Maitra | 710/308 |

FOREIGN PATENT DOCUMENTS

| | | |
|---|---|---|
| CN | 1392480 A | 1/2003 |
| CN | 1584816 A | 2/2005 |
| CN | 1690945 A | 11/2005 |

* cited by examiner

*Primary Examiner* — Kim Huynh
*Assistant Examiner* — Zahid Choudhury

(57) ABSTRACT

An apparatus includes a socket, a computer-readable medium, and a controller. The socket is capable of interfacing with different types of storage medium. The computer-readable medium is operable for storing a computer-executable universal driver associated with a first operation mode and compatible with each of the types of storage medium, and for storing a computer-executable dedicated driver associated with a second operation mode and compatible with only a subset of the types of storage medium. The controller is operable for selecting a selected driver from the universal driver and the dedicated driver if a storage medium is inserted into the socket and for operating in a corresponding operation mode to exchange data information with the storage medium according to the selected driver. The selected driver includes the dedicated driver if the storage medium is a member of the subset and otherwise the selected driver includes the universal driver.

27 Claims, 9 Drawing Sheets

APPARATUSES AND METHODS FOR TRANSFERRING DATA

RELATED APPLICATION

This application is a continuation-in-part of the co-pending U.S. application, Ser. No. 12/565,874, titled "Data Transfer System with Different Operating Modes," filed on Sep. 24, 2009, which is hereby incorporated by reference in its entirety. This application also claims priority to Chinese Patent Application No. 201010153027.6, titled "Date Transfer Devices, Methods, and Controllers," filed on Apr. 19, 2010, with the State Intellectual Property Office of the People's Republic of China.

BACKGROUND

A CompactFlash (CF) card is a mass storage device that conforms to the CompactFlash standard. The CompactFlash Association (CFA) developed the CompactFlash standard and subsequently published the CompactFlash+specification (CF+) and CompactFlash Specification Revision 4.0 (CF4). The earlier type of CF cards utilizes common memory data storages. Currently, CF+ and CF4 cards are expanded to include input/output (I/O) devices or magnetic disk data storages, depending on specific applications. The CF+ and CF4 cards support a higher data transfer rate than the earlier type of CF cards.

The earlier type of CF cards may only operate in the PC Card ATA (Advanced Technology Attachment) using memory mode. CF4 and CF+ cards can operate in the PCM-CIA (Personal Computer Memory Card International Association) mode which includes the PC Card ATA using I/O mode and the PC Card ATA using memory mode. Moreover, the CF4 cards can operate in the True IDE (Integrated Development Environment) mode and the CF+ cards may also function in the True IDE mode. In each mode, data is transferred according to a corresponding read/write timing cycle. Therefore, CF, CF+ and CF4 cards operating in different modes may have different data transfer rates.

Typically, a controller is used to control data transfer between a host (e.g., a computer) and a storage device. The controller is usually set in a predetermined mode to communicate with the storage device according to a predetermined data transfer rate. However, as CF, CF+ and CF4 cards may support different data transfer rates, the data transfer performance may be reduced. For example, if the controller is set in the PC Card ATA using memory mode, a CF+/CF4 card operating in the PC Card ATA using memory mode may have a lower data transfer rate compared to the CF+/CF4 card operating in the True IDE mode.

The PCMCIA standard is widely used in many kinds of host devices such as digital cameras, digital music players, laptop computers, personal communicators, etc. The PCM-CIA standard defines PCMCIA cards or PC cards for storage expansion, input/output (I/O) support, etc. Depending on the type of PCMCIA bus, the PC cards can include 16 bit PC cards (e.g., random access memory (RAM) and flash memory) and 32 bit PC cards (e.g., CardBus PC cards such as modem, network and TV cards). For example, a 16 bit PC card employs a 16 bit PCMCIA bus to transfer data. Likewise, a 32 bit PC card employs a 32 bit PCMCIA bus to transfer data.

The True IDE mode can include a programmed input and output (PIO) mode and a direct memory access (DMA) mode. The 16 bit PC cards may only support the PIO mode. An operating system, e.g., MICROSOFT® WINDOWS, of the host device can provide a universal device driver to drive the 16 bit PC card. For example, the universal device driver can enable the host device to work in the PIO mode. In the PIO mode, a central processing unit (CPU) of the host device executes instructions to access I/O address space so as to perform data transfer with the PC cards. In the PIO mode, the CPU may be occupied for the entire duration of the read or write operation.

The CF card, e.g., including the CF+ and CF4 cards, is also a 16 bit mass storage device. A dedicated card reader, e.g., a USB reader or a 1394 reader, can connect the CF card to the host device. The CF card may support both the PIO mode and the DMA mode. In the DMA mode, the card reader can transfer data between the CF card and memory of the host device without occupying processor time, thus allowing computation, e.g., performed by the CPU, and the data transfer, e.g., performed by the card reader, to be accomplished simultaneously. As such, the DMA mode has a higher data transfer rate than the PIO mode.

The CF card can be plugged in a PC card slot with a plug adapter or a universal card reader if the dedicated card reader is unavailable. In other words, the 16 bit PC card and the CF card can share an identical card socket, e.g., a 64 pin dual row interface, on the host device. In this condition, the CF card may be used as a 16 bit PC card. For example, the universal device driver of the operating system can enable the CF card to work in the PIO mode instead of the DMA mode. As such, the data transfer rate of the CF card may be decreased, and the efficiency of the host device may be degraded.

SUMMARY

In one embodiment, an apparatus includes a socket, a computer-readable medium, and a controller. The socket is capable of interfacing with different types of storage medium. The computer-readable medium is operable for storing a computer-executable universal driver associated with a first operation mode and compatible with each of the types of storage medium, and for storing a computer-executable dedicated driver associated with a second operation mode and compatible with only a subset of the types of storage medium. The controller is operable for selecting a selected driver from the universal driver and the dedicated driver if a storage medium is inserted into the socket and for operating in a corresponding operation mode to exchange data information with the storage medium according to the selected driver. The selected driver includes the dedicated driver if the storage medium is a member of the subset and otherwise the selected driver includes the universal driver.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Figure 1:
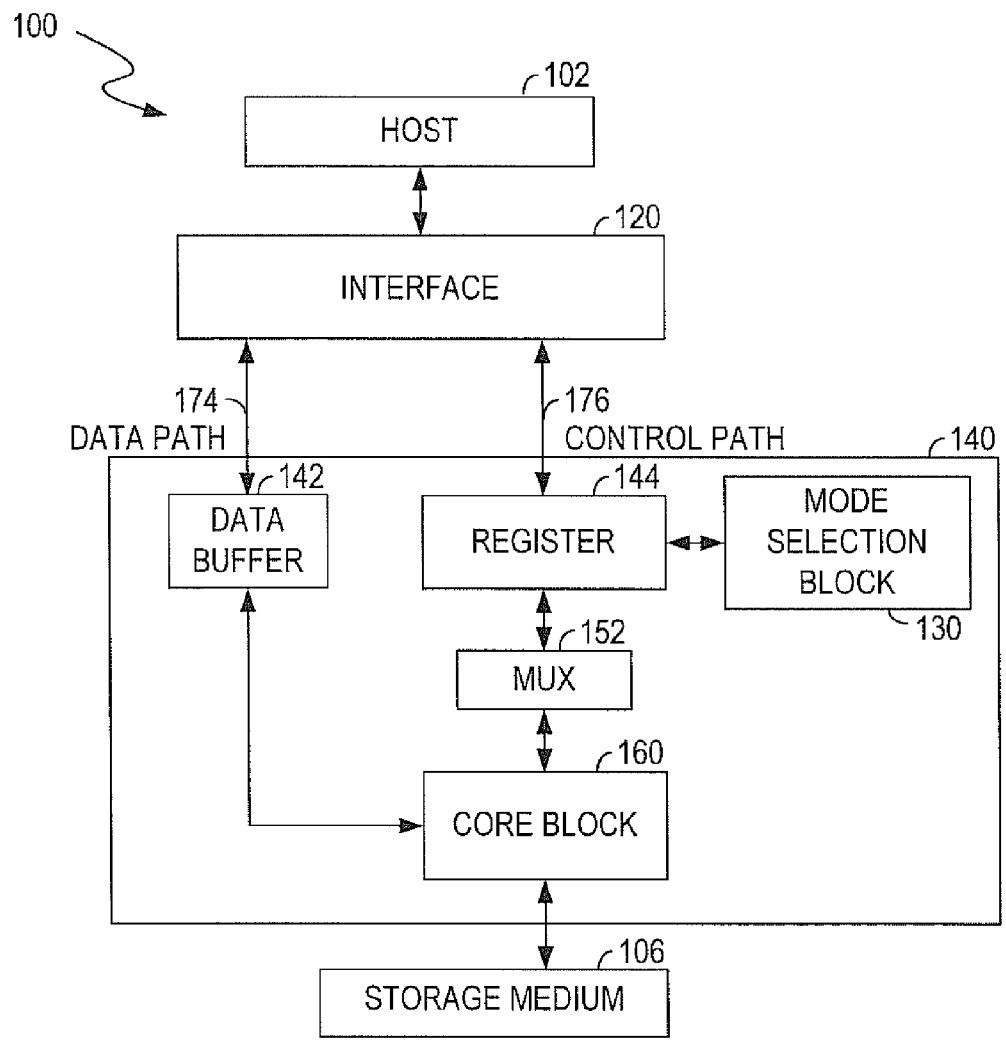
FIG. 1 shows a data transfer system with multiple operating modes according to one embodiment of the present invention.

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "loading," "determining," "identifying," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data and includes any information delivery media. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments in accordance with the present disclosure provide a data transfer system. The data transfer system includes a socket, a controller and a computer-readable medium. The socket is capable of interfacing with different types of storage medium. The computer-readable medium stores a universal driver associated with a first operation mode (e.g., a programmed input and output (PIO) mode) and compatible with each of the types of storage medium (e.g., a 16 bit PCMCIA card and a CF card). The computer-readable medium further stores a dedicated driver associated with a second operation mode (e.g., a direct memory access (DMA) mode) and compatible with only a subset of (some of but not all) the types of storage medium (e.g., the CF card). The controller is operable for selecting a selected driver from the universal driver and the dedicated driver if a storage medium is inserted into the socket, and operating in a corresponding operation mode to transfer the data information according to the selected driver.

Advantageously, the selected driver includes the dedicated driver if the storage medium is a member of the subset and otherwise the selected driver includes the universal driver. For example, if the storage medium is a CF card, the dedicated driver can be selected to enable the data transfer in the DMA mode rather than the PIO mode. As such, the data transfer rate is increased and the efficiency of the data transfer system is improved.

Data Transfer System with Different Operating Modes

FIG. 1 shows a data transfer system 100 according to one embodiment of the present invention. In the example of FIG. 1, the data transfer system 100 includes a host 102, an interface 120, a controller 140, and a client. In one embodiment, the client includes a storage medium 106. The storage medium 106 can be, but is not limited to, a CF+ card or a CF4 card. The controller 140 and the interface 120 transfer data between the host 102 and the storage medium 106. The interface 120 can be, but is not limited to, a Peripheral Component Interconnect (PCI) interface, a PCI extended (PCI-X) interface, or a PCI express (PCIe) interface. The host 102 can be an electronic device or system, such as a computer, a personal digital assistance (PDA), a mobile phone, or the like. The host 102 can read data from the storage medium 106 or write data into the storage medium 106.

The interface 120 can serve as an I/O (input/output) interconnect between the host 102 and the controller 140. The information transferred between the host 102 and the controller 140 can include data information and control information. In one embodiment, the host 102 operates as a master to initiate a data transfer. In this instance, the host 102 can send the control information to the controller 140. The control information can enable the hand-shake between the host 102 and the controller 140 before the data information is transferred. The control information can define a characteristic of the data transfer, for example, whether the data is written into the storage medium 106 or read out from the storage medium 106. For example, the data information can be transferred from the host 102 to the controller 140 in a write operation, and the data information can be transferred from the controller 140 to the host 102 in a read operation. The control information can also indicate a status of the data transfer, for example, start/initiation of the data transfer. In another embodiment, the storage medium 106 can operate as a master to initiate a data transfer. In this instance, the storage medium can send the control information to the controller 140.

In one embodiment, the interface 120 can analyze the information transferred from the host 102 to determine if the host 102 transfers data information or control information. The interface 120 can selectively transfer the information through a data path 174 or a control path 176 depending on whether the host 102 transfers the data information or the control information. If the host transfers the data information, the data can be sent to the controller 140 through the data path 174. If the host 102 transfers the control information, the control information can be sent to the controller 140 through the control path 176. Moreover, the interface 120 can packet the data information from the controller 140 into data readable by the host 102 (computer-readable data) and transfer the data to the host 102.

The controller 140 can transfer the data information between the interface 120 and the storage medium 106. Advantageously, the controller 140 coupled between the interface 120 and the storage medium 106 can operate in multiple operating modes to control the data transfer between the host 102 and the storage medium 106. In one embodiment, at least two of the operating modes have different data read/write timing cycles. A read cycle is the time needed between the start of a read operation and the start of the next read cycle. Similarly, a write cycle is the time needed between the start of a write operation and the start of the next write cycle. Therefore, at least two of the operating modes have different data transfer rates. In one embodiment, the multiple modes include, but are not limited to, a PCMCIA mode and a True IDE mode. In the PCMCIA mode, the data is transferred according to a corresponding write/read timing of the PCMCIA standard. In the True IDE mode, the data is transferred according to a corresponding write/read timing of the True IDE standard.

Advantageously, the controller 140 can select an operating mode from the multiple operating modes based on a type of the storage medium 106. Since different types of the storage medium 106 may support different operation modes, the controller 140 can transfer data between the host 102 and the storage medium 106 in a mode that is compatible with the storage medium 106. For example, if the storage medium 106 is a CF+ or CF4 card, the controller 140 can select the PCMCIA mode or True IDE mode as the operating mode. In other words, the controller 140 can be a universal controller and can select a proper operating mode according to the type of the storage medium 106. The controller 140 can operate in the selected operating mode to enable the data transfer between the I/O interface 120 and the storage medium 106 according to a corresponding data read/write timing cycle and a corresponding data transfer rate of the selected operating mode. In one embodiment, if more than one mode in the multiple operating modes is compatible with the storage medium 106, the controller 140 can select a mode that provides desired data transfer performance, e.g., relatively high data transfer rate, as the operating mode.

Moreover, in one embodiment, the operating mode selected by the controller 140 can include multiple sub-modes. The controller 140 can select an operating sub-mode from the multiple sub-modes based on a predetermined operation standard. For example, the PCMCIA mode can include multiple sub-modes, such as a PC card ATA using I/O mode and a PC card ATA using memory mode. When the controller 140 operates in the PC card ATA using I/O mode or the PC card ATA using memory mode, the storage medium 106 uses different signals to communicate with the controller 140. For example, when the storage medium 106 is a CF+ or CF4 card and when the controller 140 operates in the PC card ATA using I/O mode, the storage medium 106 uses signals at the No. 34 and 35 pins of the storage medium 106 to communicate with the controller 140. In one embodiment, the controller 140 uses the signal IORD at the pin 34 to read data from the storage medium 106, and uses the signal IOWR at the pin 35 to write data from the host 102 into the storage medium 106. However, when the controller 140 operates in the PC card ATA using memory mode, the storage medium 106 does not use the signals at the pins 34 and 35, in one embodiment. By way of example, when the storage medium 106 is a CF+ or CF4 card and when the controller 140 operates in the PC card ATA using memory mode, the storage medium 106 uses signals at the No. 9 and 36 pins of the storage medium 106 to communicate with the controller 140. In one embodiment, the controller 140 uses the signal OE at the pin 9 to read data from the storage medium 106, and uses the signal WE at the pin 36 to write data from the host 102 into the storage medium 106. However, when the controller 140 operates in the PC card ATA using I/O mode, the controller 140 uses the signal OE at the pin 9 to read data from configuration registers of the storage medium 106, and uses the signal WE at the pin 36 to write data into the configuration registers in the storage medium 106.

The True IDE mode can include multiple sub-modes, such as a programmed I/O (PIO) mode, a multiword direct memory access (MDMA) mode, and an ultra direct memory access (UDMA) mode. By way of example, when the storage medium 106 is a CF+ or CF4 card and when the controller 140 operates in the PIO mode, there is an interrupt after a predetermined length of data, e.g., 512 bits of data, is transferred from the host 102 to the storage medium 106. When the controller 140 operates in the MDMA mode, all the data can be transferred from the host 102 to the storage medium 106 at one time without any interrupt. When the controller 140 operates in the UDMA mode, the storage medium 106 can operate as a master, e.g., the storage medium 106 can initiate a data transfer from the storage medium 106 to the host 102. In this embodiment, the storage medium 106 can send control information, e.g, a DMA request, to the controller 140 to initiate the data transfer. The PIO mode can further include multiple PIO modes. The multiple PIO modes may have different read/write timing cycles. Similarly, the MDMA mode can further include multiple MDMA modes. The multiple MDMA modes may have different read/write timing cycles. The UDMA mode can further include multiple UDMA modes. The multiple UDMA modes may also have different read/write timing cycles. The controller 140 can select an operating sub-mode from the multiple sub-modes based on a predetermined operation standard.

In one embodiment, the predetermined operation standard is a data transfer rate standard. The controller 140 selects an operating sub-mode to obtain a desired data transfer rate, e.g., a relatively high data transfer rate, of the data transfer between the I/O interface 120 and the storage medium 106. In another embodiment, the predetermined operation standard is a priority standard. The controller 140 can determine a priority of the data transfer request and selects an operating sub-mode according to the priority of a data transfer request of a data transfer between the I/O interface 120 and the storage medium 106. For example, in the data transfer system 100, the request for the data transfer between the host 102 and the storage medium 106 may coexist with other requests such as an interrupt request. If the priority of the request for the data transfer between the host 102 and the storage medium 106 is relatively high, the mode selection block 130 can select an operating sub-mode that supports a relatively high data transfer rate. If the priority of the request for the data transfer between the host 102 and the storage medium 106 is relatively low, the mode selection block 130 can select an operating sub-mode that supports a relatively low data transfer rate. In one embodiment, the mode-select block 130 executes a computer-executable program to select the operating mode and/or the sub-mode.

In the example of FIG. 1, the controller 140 includes a data buffer 142, a register 144, a mode selection block 130, a multiplexer (MUX) 152, and a core block 160. The data buffer 142 can buffer the data information from the interface 120 and provide the data information to the core block 160. The data buffer 142 can also buffer the data information from the core block 160 and provide the data information to the interface 120. The register 144 can store the control information received from the interface 120 when the host 102 operates as a master or from the storage medium 106 when the storage medium 106 operates as a master, and can store mode data indicative of the multiple operating modes and sub-modes in which the controller 140 can operate. The mode data can be accessed by the mode selection block 130 to select the operating mode and/or sub-mode for the controller 140. In one embodiment, the register 144 also stores data which indicates if the data transfer is completed and which can be accessed by the host 102. In this instance, the core block 160 can generate the data indicative of the completion of the data transfer. In another embodiment, the host 102 can determine if the data transfer is completed by itself.

The core block 160 is coupled to the data buffer 142 and can include multiple cores. Each core can operate in a corresponding mode to communicate with the storage medium 106. In one embodiment, a core can be a micro-controller and can generate signals (e.g., a read/write signal) according to the read/write timing of a corresponding mode to enable a data transfer process. The storage medium 106 receives the signals generated by the core and responses accordingly. For example, if the host 102 initiates a data transfer to write data into the storage medium 106, the corresponding core can generate a write signal according to the control information from the host 102. In response, the storage medium 106 receives the data information transferred from the host 102. If the host 102 initiates a data transfer to read data from the storage medium 106, the corresponding core can generate a read signal according to the control information from the host 102. In response, the storage medium 106 transfers/provides the data information to the host 102. In one embodiment, if an operating mode is selected, a corresponding core can be enabled according to the selected operating mode to communicate with the storage medium 106. The data can be transferred between the host 102 and the storage medium 106 via the enabled core.

In one embodiment, before any operating mode is selected by the mode selection block 130, the controller 140 operates in a default mode and a default core that can operate in the default mode is used to communicate with the storage medium 106.

The mode selection block 130 can select an operating mode from the multiple operating modes based on the type of the storage medium 106 and select an operating sub-mode from the multiple sub-modes based on a predetermined operation standard. More specifically, the mode selection block 130 can access the mode data stored in the register 144 indicative of multiple modes and sub-modes in which the controller 140 can operate. The mode selection block 130 can detect the type of the storage medium 106 and the mode(s) supported by the storage medium 106. In one embodiment, the mode selection block 130 can send an identification command to the register 144 to request identity information of the storage medium 106. Data indicating the identification command can be written into the register 144. The default core in the core block 160 can monitor the register 144 and can generate a signal requesting identity information for the storage medium 106 accordingly. In response, the storage medium 106 can send data indicative of the type of the storage medium 106 and the mode(s) supported by the storage medium 106 to the register 144 via the default core. Thus, the mode selection block 130 can access the identity information of the storage medium 106 in the register 144. The mode selection block 130 selects an operating mode which is compatible with the storage medium 106 from the multiple modes. In one embodiment, if more than one mode in the multiple modes is compatible with the storage medium 106, the mode selection block 130 can select a mode that provides desired data transfer performance, e.g., relatively high data transfer rate, as the operating mode. If the selected operating mode includes multiple sub-modes, the mode selection block 130 can further select an operating sub-mode according to the predetermined operation standard from the corresponding multiple sub-modes.

Once the operating mode is selected, the mode selection block 130 can configure the controller 140 to operate in the selected operating mode or sub-mode. In one embodiment, the mode selection block 130 configures the controller 140 by writing the corresponding mode data indicative of the selected operating mode and/or sub-mode into the register 144.

The multiplexer 152 is coupled to the register 144 and the core block 160 for enabling one of the cores according to the mode data indicative of the selected operating mode and/or sub-mode in the register 144. Consequently, the enabled core can communicate with the storage medium 106, for example, to transfer the data information to the storage medium 106, according to the data transfer rate in the selected operating mode and/or sub-mode.

An example of transferring data from the host 102 to the storage medium 106 is described here. In one embodiment, the host 102 first transfers control information to the controller 140 through the interface 120 and the control path 176 to initiate a data transfer from the host 102 to the storage medium 106. When the register 144 receives the control information, the mode selection block 130 can be enabled to select an operating mode. The mode selection block 130 can select the operating mode and can further select an operating sub-mode. Thus, the mode selection block 130 can set the controller 140 in the selected operating mode and the selected operating sub-mode. According to the operating mode and the operating sub-mode selected by the mode selection block 130, the multiplexer 152 can enable one of the cores in the core block 160 to communicate with the storage medium 106. The host 102 transfers the data information to the data buffer 142 through the interface 120 and the data path 174. The data buffer 142 can provide the data information to the enabled core in the core block 160. As such, the data information can be sent to the storage medium 106. The host 102 can access the register 144 to determine if the data transfer is completed, in one embodiment.

An example of transferring data from the storage medium 106 to the host 102 is described here. In one embodiment, the host 102 first sends control information to the controller 140 through the interface 120 and the control path 176 to request a data transfer from the storage medium 106 to the host 102. After the controller 140 is set in the selected operating mode and the selected operating sub-mode by the mode selection block 130, the multiplexer 152 can enable one of the cores in the core block 160 to communicate with the storage medium 106. As such, the data can be transferred from the storage medium 106 to the core block 160. Through the data buffer 142, the data path 174, and the interface 120, the data can be sent to the host 102. The host 102 can access the register 144 to determine if the data transfer is completed, in one embodiment.

As described above, the host 102 operates as a master to initiate a data transfer. In another embodiment, the storage medium 106 can operate as a master to initiate a data transfer. In this embodiment, the mode selection block 130 can be first enabled by the host 102 to select an operating mode. By way of example, when the storage medium 106 is a CF+ or CF4 card, the mode selection block 130 selects the True IDE mode as the operating mode and further selects the UDMA mode as the operating sub-mode. Thus, the mode selection block 130 sets the controller 140 in the UDMA mode. The multiplexer 152 enables a core in the core block 160 that can operate in the UDMA mode to communicate with the storage medium 106. In the UDMA mode, the storage medium 106 operates as a master to initiate a data transfer between the storage medium 106 and the host 102.

More specifically, the storage medium 106 sends control information to the controller 140 to initiate a data transfer, in one embodiment. The enabled core in the core block 160 can analyze the information transferred from the storage medium 106 to determine if the storage medium 106 transfers data information or control information. If the storage medium 106 transfers the control information, the core block 160 can analyze the control information to determine whether the storage medium 106 initiates a read operation (read data from the host 102) or a write operation (write data into the host 102). If the storage medium 106 transfers the data information, the controller 140 can transfer the data information through the data path 142. If the storage medium 106 initiates a data transfer to write data into the host 102, the enabled core can generate a read signal according to the control information from the storage medium 106. In response, the host 102 receives the data information transferred from the storage medium 106 via the data path 174. If the storage medium 106 initiates a data transfer to read data from the host 102, the enabled core can generate a write signal according to the control information from the storage medium 106. In response, the host 102 transfers/provides the data information to the storage medium 106 via the data path 174.

Therefore, the controller 140 can select an operating mode based on the type of the storage medium 106. Furthermore, the controller 140 can select an operating sub-mode according to a predetermined operation standard. Advantageously, the controller 140 can provide data transfer control adapted to various storage medium 106 and in accordance with various operation standards.

In one embodiment, before the storage medium 106 is coupled to the controller 140, the controller 140 can be set in a default operating mode. In one embodiment, the default mode can be a mode that supports a relatively high data transfer rate. After the storage medium 106 is coupled to the controller 140, the mode selection block 130 can determine if the default mode is compatible with the storage medium 106. If the default mode is compatible with the storage medium 106, the controller 140 can operate in the default mode to communicate with the storage medium 106. Thus, higher data transfer performance can be achieved. If the default mode is not compatible with the storage medium 106, the mode selection block 130 can select another mode.

Figure 2:
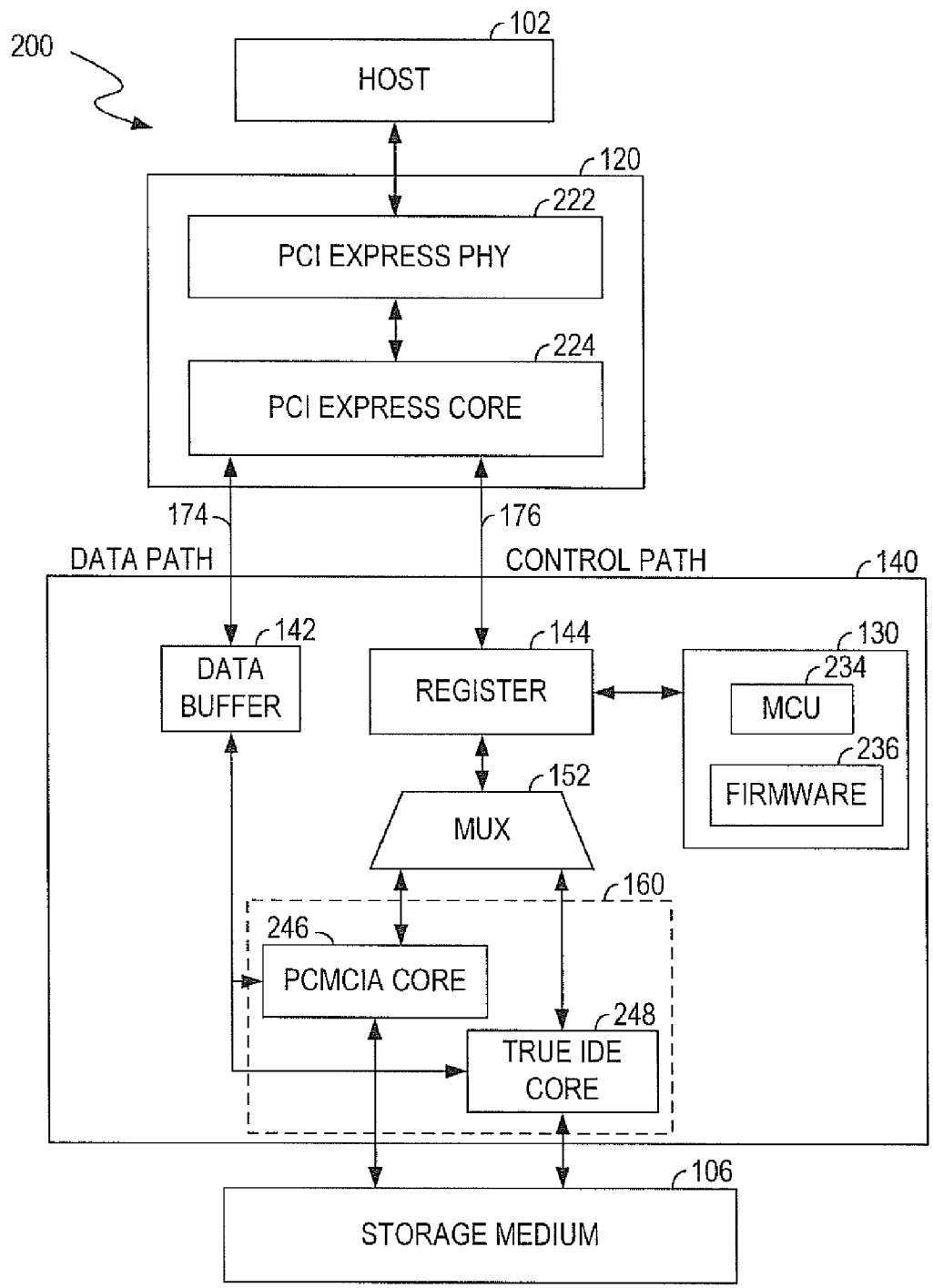
FIG. 2 shows a data transfer system with multiple operating modes according to another embodiment of the present invention.

FIG. 2 shows a data transfer system 200 according to one embodiment of the present invention. Elements labeled the same as in FIG. 1 have similar functions. In the example of FIG. 2, the data transfer system 200 includes the host 102, the Peripheral Component Interconnect Express (PCIe) interface 120, the controller 140, and the storage medium 106. The storage medium 106 can be, but is not limited to, a CF+ card or a CF4 card. The controller 140 and the PCIe interface 120 can transfer data between the host 102 and the storage medium 106.

The PCIe interface 120 serves as an I/O interconnect to transfer data between the host 102 and the controller 140. PCIe is a computer interconnect standard having a relatively high speed data transfer rate. For example, a PCIe link is able to support up to 32 lanes and provide an effective 2.5 Gigabits/second/Lane/direction of raw bandwidth. Thus, PCIe provides higher performance than the PCI and PCI-X. In addition, PCIe supports Hot-Plug/Hot-Swap. In the embodiment of FIG. 2, the PCIe interface 120 includes a PCIe physical (PHY) layer 222 and a PCIe core 224. If the host 102 sends serial data to the PCIe interface 120, the PCIe PHY layer 222 can transform the serial data into parallel data and provide the parallel data to the PCIe core 224. The PCIe core 224 can analyze the parallel data to determine whether the information sent from the host 102 is data information or control information. The PCIe core 224 transfers the data information to the controller 140 through the data path 174 and transfers the control information to the controller 140 through the control path 176. As such, the information from the host 102 can be sent to the controller 140 via the PCIe interface 120.

Similarly, if the controller 140 transfers the data information to the PCIe interface 120, the PCIe core 224 can packet the data information to provide the parallel data to the PCIe PHY layer 222. The PCIe PHY layer 222 can transform the parallel data into the serial data and send the serial data to the host 102. As such, the PCIe interface 120 can transfer the data information to the host 102.

The controller 140 can communicate with the storage medium 106 to transfer data between the PCIe interface 120 and the storage medium 106. In the example of FIG. 2, the controller 140 includes the data buffer 142, the register 144, the mode selection block 130, the multiplexer 152, and the core block 160. In one embodiment, the core block 160 includes a PCMCIA core 246 and a True IDE core 248. The PCMCIA core 246 can operate in the PCMCIA mode. The True IDE core 248 can operate in the True IDE mode.

The mode selection block 130 can select an operating mode according to the type of the storage medium 106 from the PCMCIA mode and the True IDE mode. Furthermore, if the selected operating mode includes multiple sub-modes, the mode selection block 130 can select an operating sub-mode according to a predetermined operation standard from the corresponding multiple sub-modes.

In the embodiment of FIG. 2, the mode selection block 130 includes a micro controller unit (MCU) 234 and firmware 236. The firmware 236 can store a computer-executable program. The MCU 234 can execute the computer-executable program in the firmware 236 to select the operating mode and/or sub-mode. The MCU 234 can read the mode data in the register 144 indicative of the operating modes and/or sub-modes in which the controller 140 can operate. The MCU 234 can issue an identification command (e.g., an Identify Device command if the storage medium 106 is a CF4 card) to detect the type of the storage medium 106 and the modes that the storage medium 106 can support. After selecting the operating mode and/or the operating sub-mode, the MCU 234 can issue a configuration command (e.g., a Set Feature command if the storage medium 106 is a CF4 card) to configure a register in the storage medium 106 to set the storage medium 106 in the selected operating mode and/or sub-mode, and can configure the register 144 to set the controller 240 in the selected operating mode and/or sub-mode by writing the mode data indicative of the selected operating mode and/or sub-mode in the register 144.

According to the operating mode selected by the mode selection block 130, the multiplexer 152 enables one of the PCMCIA core 246 and the True IDE core 248 according to the mode data indicative of the selected operating mode in the register 144. Thus, the enabled core can communicate with the storage medium 106 according to the corresponding data transfer rate in the selected operating mode and/or sub-modes. In another embodiment, a single core can selectively operate in the PCMCIA mode or the True IDE mode to communicate with the storage medium 106. Consequently, the data transfer between the host 102 and the storage medium 106 can be enabled.

Therefore, the controller 140 can control data transfer adapted to various storage medium 106 and in accordance with various operation standards. Furthermore, the storage medium 106 can communicate with host systems via the PCIe interface 120 having relatively high performance. As such, the performance of the data transfer can be further improved. Moreover, the controller 140 supports the hot plug since the PCIe interface 120 supports the hot plug.

In one embodiment, before the storage medium 106 is coupled to the controller 140, the controller 140 is set in a default mode. In one embodiment, the default mode can be the True IDE mode. After the storage medium 106 is coupled to the controller 140, the mode selection block 130 can issue an identification command (e.g., an Identify Device command if the storage medium 106 is a CF4 card) to the storage medium 106 to determine if the default mode is compatible with the storage medium 106. If the default mode is compatible with the storage medium 106, the MCU 234 can issue a configuration command (e.g., a Set Feature command if the storage medium 106 is a CF4 card) to set the storage medium 106 in the PCMCIA mode.

Figure 3:
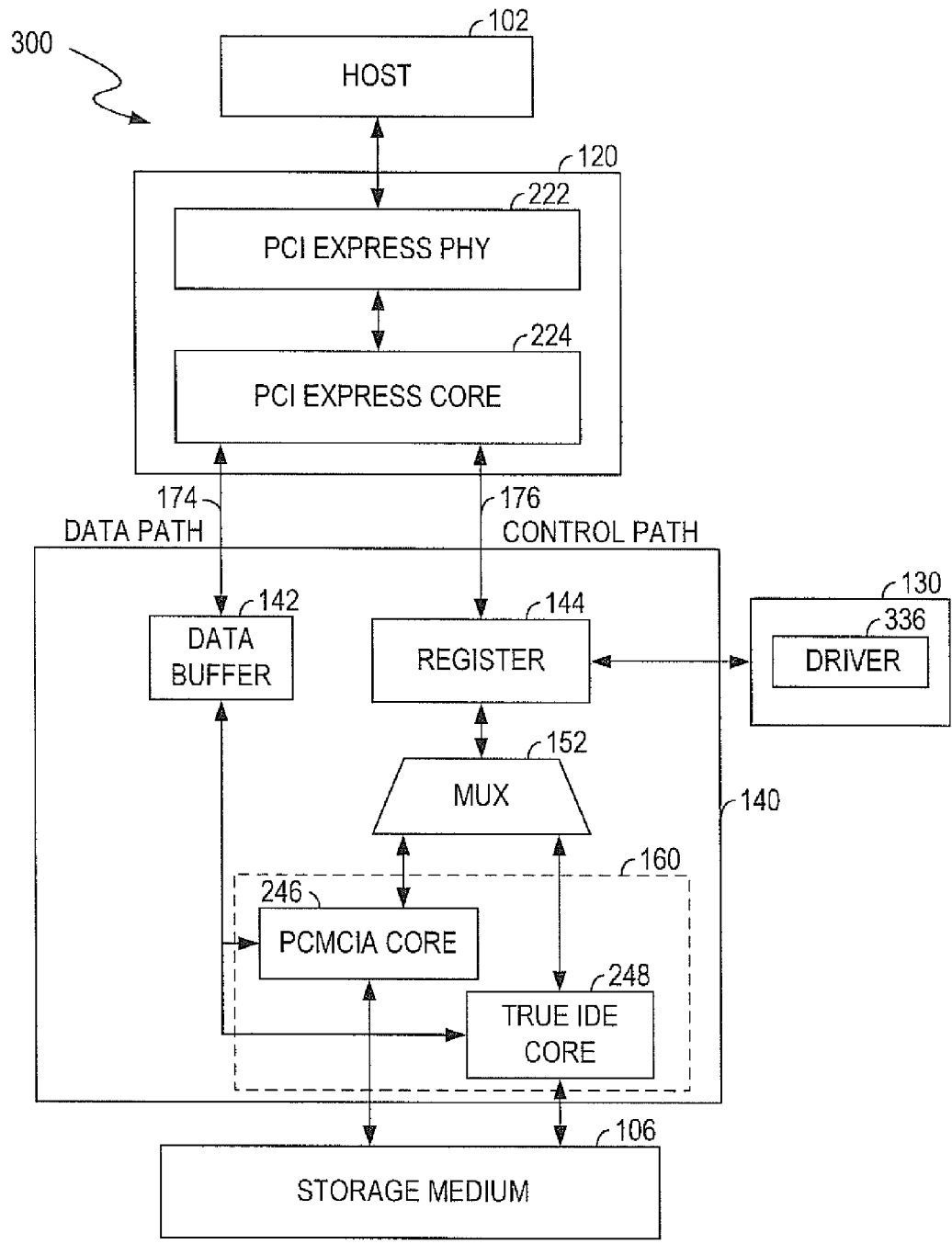
FIG. 3 shows a data transfer system with multiple operating modes according to another embodiment of the present invention.

FIG. 3 shows a data transfer system 300 according to another embodiment of the present invention. Elements labeled the same as in FIG. 2 have similar functions.

In the embodiment of FIG. 3, the mode selection block 130 can be located outside the controller 140. The mode selection block 130 includes a driver 336, e.g., a computer-executed program for selecting the operating mode and the operating sub-mode. In one embodiment, a signal processor (not shown) of the host 102, for example, a central processing unit (CPU), can execute the driver 336 to perform the mode selection function.

Figure 4:
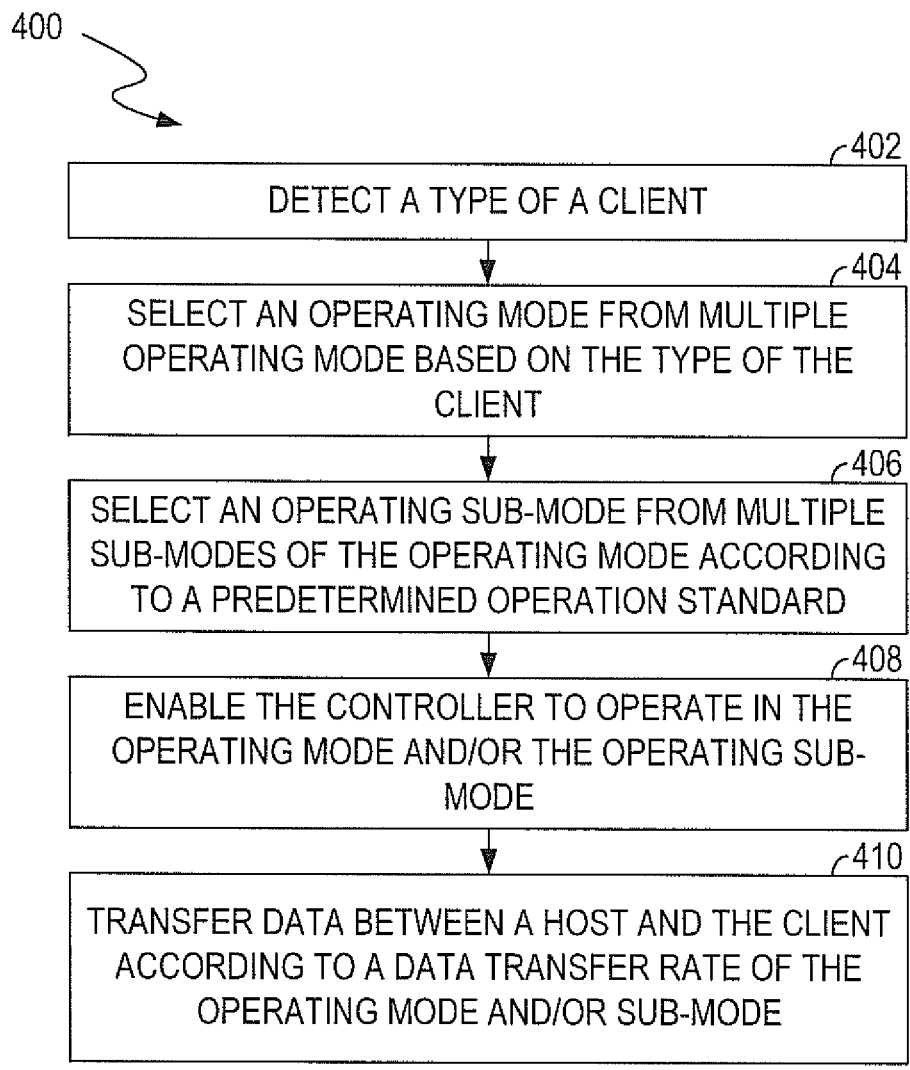
FIG. 4 is a flowchart of a method for controlling data transfer according to one embodiment of the present invention.

FIG. 4 shows a flowchart 400 of a method for controlling data transfer according to one embodiment of the present invention. FIG. 4 is described in combination with FIG. 1. Although specific steps are disclosed in FIG. 4, such steps are examples. That is, the present invention is well suited to performing various other steps or variations of the steps recited in FIG. 4. In one embodiment, the flowchart 400 is implemented as computer-executable instructions stored in a computer-readable medium.

In block 402, a type of the storage medium 106 and the mode(s) supported by the storage medium 106 can be detected. In block 404, an operating mode is selected from multiple operating modes based on the type of the storage medium 106. For example, the mode selection block 130 in the controller 140 can access the mode data stored in the register 144 indicative of multiple modes and sub-modes in which the controller 140 can operate. The mode selection block 130 selects an operating mode which is compatible with the storage medium 106 from the operating modes.

In block 406, an operating sub-mode is selected from multiple sub-modes according to a predetermined operation standard. In one embodiment, the selected operating mode may include multiple sub-modes. In this instance, the mode selection block 130 can further select the operating sub-mode from the corresponding sub-modes according to the predetermined operation standard, e.g., a data transfer rate standard or a priority standard.

In block 408, the controller 140 can be enabled in the operating mode and/or sub-mode. The mode selection block 130 can configure the register 144 to set the controller 140 in the operating mode and/or sub-mode. In one embodiment, the mode selection block 130 can write the mode data indicative of the selected operating mode and/or sub-mode in the register 144 to set the controller 140 in the selected operating mode and/or sub-mode.

In block 410, the controller 140 can transfer data between the storage medium 106 and the host 102 according a data transfer rate and a read/write timing cycle of the selected operating mode. According to the mode data that indicates the selected operating mode and/or sub-mode in the register 144, the multiplexer 152 can enable a core in the core block 160. As such, the enabled core can communicate with the storage medium 106 to exchange data with the storage medium 106 according to the data transfer rate and the read/write timing cycle of the selected operating mode.

Apparatuses and Methods for Transferring Data

Figure 5:
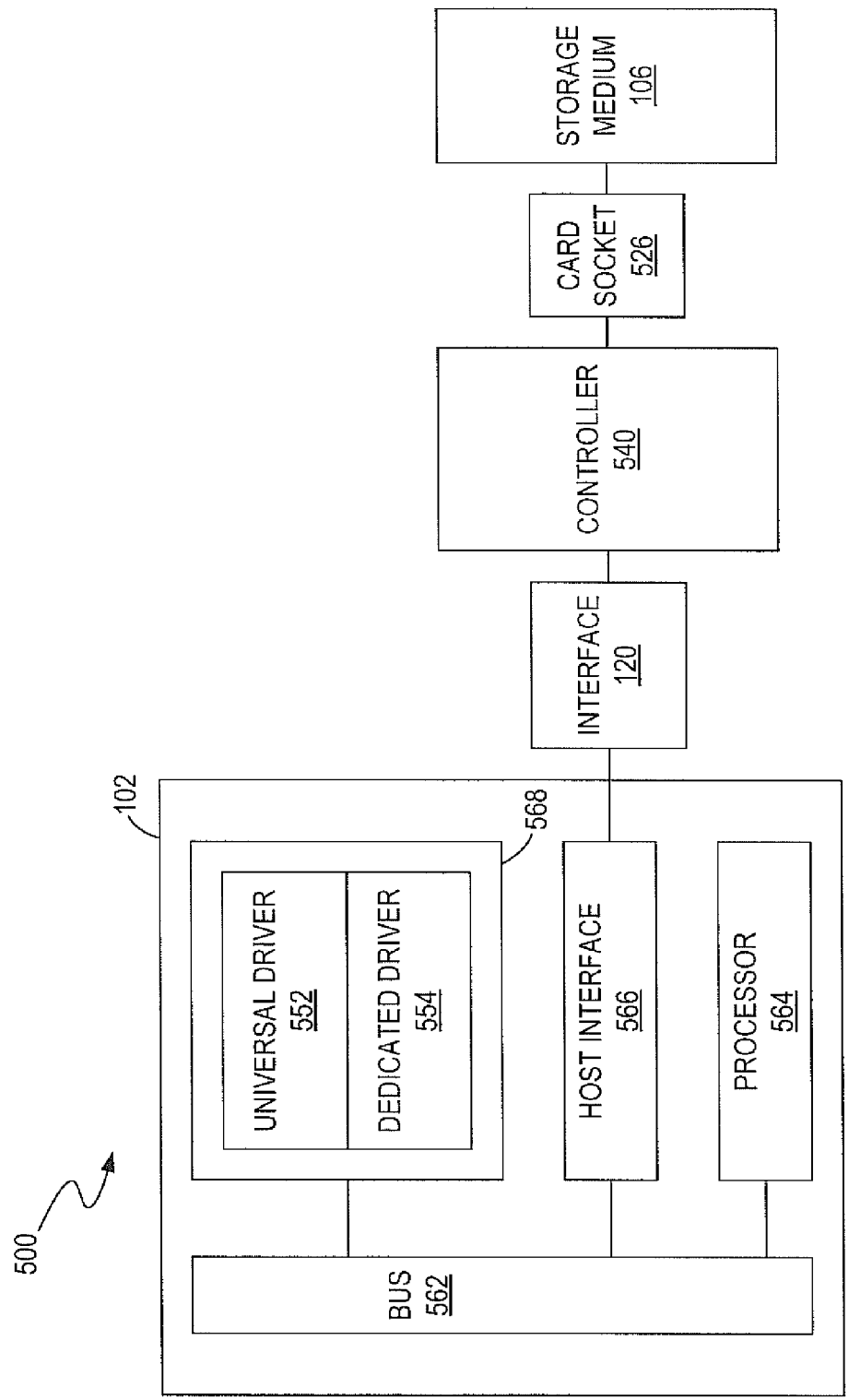
FIG. 5 illustrates a block diagram of a data transfer system, in accordance with one embodiment of the present invention.

FIG. 5 illustrates another block diagram of a data transfer system 500, in accordance with one embodiment of the present invention. Elements labeled the same as in other figures have similar functions. FIG. 5 is described in combination with FIG. 1.

In the example of FIG. 5, the data transfer system 500 includes the host 102, the interface 120, a controller 540, a universal card socket 526, and the storage medium 106. In one embodiment, the storage medium 106 includes, but is not limited to, a 16 bit PC card or a CompactFlash (CF) card. The CF card can include, but is not limited to, a CF+ card and a CF4 card. Both the 16 bit PC card and the CF card allow for a 16 bit data transfer. The host 102 can read data information from the storage medium 106 or write data information to the storage medium 106 via the interface 120, the controller 540, and the universal card socket 526.

In one embodiment, the host 102 includes a bus 562, a processor 564, a host interface 566, and memory 568. The memory 568 can be, but is not limited to, a random access memory (RAM), a read only memory (ROM), an electrically erasable programmable ROM (EEPROM), or a flash memory. The memory 568 can store data and computer-executable programming instructions. The processor 564 can be a central processing unit (CPU), a microprocessor, a digital signal processor, or any other such device that can read and execute programming instructions.

In one embodiment, an operating system, e.g., MICROSOFT® WINDOWS, is installed in the memory 568 of the host 102. The operating system provides a registry having a service-group-order file. The service-group-order file lists multiple service groups in a predetermined order. When the host 102 is booted, the processor 564 can load corresponding programs following the predetermined order. To run a particular program, the processor 564 calls instructions of the related program and sends corresponding control commands to associate hardware elements to execute such instructions. The processor 564 can also send commands to control a device coupled to the host 102, e.g., the controller 540 and the storage medium 106.

The host interface 566 can be a serial interface, a parallel interface, or another type of interface, and is capable of sending and receiving electrical, electromagnetic or optical signals that carry digital data streams. For example, the host interface 566 interfaces with the controller 540 to transfer the data information and the control information. Communications among hardware elements of the host 102, e.g., the processor 564, the memory 568, and the host interface 566, are established via the bus 562. The host 102 can include other components and is not limited to the example of FIG. 5.

The interface 120 coupled between the host interface 566 and the controller 540 serves as an I/O interconnect between the host 102 and the controller 540. The controller 540 is capable of transferring the data information between the host 102 and the storage medium 106. In one embodiment, the universal card socket 526 is capable of interfacing with different types of storage medium. For example, the card socket 526 can be a 68 pin dual row connecting interface, and thus both the 16 bit PC card and the CF card can be plugged into the card socket 526.

Similar to the controller 140 in relation to FIG. 1, the controller 540 can operate in multiple operation modes to control the data transfer between the host 102 and the controller 540. Different operation modes have different data read/write timing cycles. In one embodiment, since both the 16 bit PC card and the CF card can support the read/write timing of the True IDE standard, the controller 540 can operate in multiple sub-modes of the True IDE mode. Thus, the operation modes of the controller 540 can include a programmed input and output (PIO) mode and a direct memory access mode (DMA). In one embodiment, both the 16 bit PC card and the CF card can work in read/write timing of the PIO standard, but only the CF card has ability to work in read/write timing cycles of the DMA standard. In such an embodiment, the PIO mode is compatible with both the 16 bit PC card and the CF card, while the DMA mode is only compatible with the CF card.

The memory 568 can store multiple computer-executable drivers for driving the controller 540. More specifically, the drivers can be executed by the processor 564 to generate control commands such as an initiation command. The initiation command can enable a hand-shake between the host 102 and the controller 540 before the data information is transferred. Moreover, the initiation command can define characteristic of the data transfer, e.g., whether the data is written into the storage medium 106 or read out from the storage medium 106. The initiation command can also indicate a status of the data transfer, e.g., start/initiation of the data transfer. As such, the controller 540 can transfer the data information according to the initiation command.

Different drivers are associated with different operation modes. In other words, the controller 540 is capable of operating in different operation modes to transfer the data information based on control commands from multiple drivers. In one embodiment, the drivers include a universal driver 552 and a dedicated driver 554. The universal driver 552 is associated with the PIO mode and compatible with the multiple types of the storage medium that are capable of inserting into the universal socket 526, e.g., the 16 bit PC card and the CF card. The dedicated driver 554 is associated with the DMA mode and compatible with only a subset of (some of but not all) the types of the storage medium, e.g., the dedicated driver 554 is only compatible with the CF card.

In one embodiment, the universal driver 552 is provided by the operating system of the host 102 and has a universal-card-driver group in the registry of the operating system. Based on control commands from the universal driver 552, the data transfer system 500 can transfer the data information in the PIO mode. More specifically, in the PIO mode, the processor 564 executes the universal driver 552 to initiate the data transfer and to control the whole process of the data transfer. For example, for a write operation, the processor 564 transfers the data information from the memory 568 to an internal cache of the processor 564. After a predetermined length of data, e.g., 512 bytes of data, is stored in the internal cache, the processor 564 writes the data information from the internal cache to the storage medium 106 via the controller 540. Likewise, for a read operation, the processor 564 fetches the data information from the storage medium 106 through the controller 540 to the internal cache. After the predetermined length of data is transferred, the processor 564 stores the data information from the internal cache to the memory 568. As such, there is an interrupt each time after the predetermined length of data is transferred in the PIO mode.

The dedicated driver 554 can be installed in the memory 568 of the host 102, and can store a dedicated-card-driver group in the service-group-order file once the dedicated driver 554 is installed. Based on control commands from the dedicated driver 554, the data transfer system 500 can transfer the data information in the DMA mode. More specifically, in the DMA mode, the controller 540 can operate as a master to control the whole process of the data transfer. By way of example, in the DMA mode, e.g., a multi-word direct memory access (MDMA) mode or an ultra direct memory access (UDMA) mode, the processor 564 executes the dedicated driver 554 to initiate a data transfer for a write or read operation. Then, the processor 564 consigns a bus control right to the controller 540 and is released from process of the data transfer according to instruction codes of the dedicated driver 554. Subsequently, the controller 540 starts to transfer the data information between the memory 568 and the storage medium 106 without occupying processor time. In this instance, all the data information can be transferred at one time without any interrupt. As such, the DMA mode has a higher data transfer rate than the PIO mode. Moreover, the processor 564 can handle other operations more efficiently, e.g., computation operations.

The drivers stored in the memory 568 can further enable the controller 540 to select a corresponding operation mode. During a start-up of the data transfer system 500, the controller 540 selects the dedicated driver 554 by default, in one embodiment. The dedicated driver 554 can identify the storage medium 106 and determines whether the DMA mode is compatible with the storage medium 106 according to a type of the storage medium 106. Based on the determination, the controller 540 selects a corresponding driver and operates in a corresponding operation mode to transfer the data information.

More specifically, when the storage medium 106 is inserted into the card socket 526, the controller 540 provides a corresponding card-insertion signal to the dedicated driver 554. In response to the card-insertion signal, the dedicated driver 554 reads identification information, e.g., card identification structure (CIS), contained in the storage medium 106, and identifies the type of the storage medium 106, e.g., whether the storage medium 106 is a 16 bit PC card or a CF card. As such, the dedicated driver 554 can determine whether the DMA mode is compatible with the storage medium 106 according to the identified type, in one embodiment. If the storage medium 106 is a 16 bit PC card which does not support the DMA mode, the dedicated driver 554 generates a select-universal-driver command. In response to the select-universal-driver command, the controller 540 selects the universal driver 552 and transfers the data information in the PIO mode accordingly. If the storage medium 106 is a CF card which supports the DMA mode, the dedicated driver 554 enables the controller 540 to transfer the data information in the DMA mode.

If the host 102 is booted and the dedicated driver 554 has not been loaded yet, the universal driver 552 may start to drive the controller 540 whether the storage medium 106 is a CF card or a 16 bit PC card. Advantageously, the dedicated driver 554 can be executed by the processor 564 to add the dedicated-card-driver group to the service-group-order file prior to adding the universal-card-driver group. Therefore, the processor 564 can load the dedicated driver 554 before loading the universal driver 552.

As a result, by selecting a selected driver from the universal driver 552 compatible with each of the types of the storage medium and the dedicated driver 554 compatible with only a subset of the types of the storage medium, the data transfer system 500 can exchange the data information with the different types of the storage medium that share the identical card socket 526. Advantageously, the selected driver includes the dedicated driver 554 if the storage medium is a member of the subset and otherwise the selected driver includes the universal driver 552. For example, if the storage medium 106 is a 16 bit PC card supporting the PIO mode, the universal driver 552 is selected to enable the data transfer in the PIO mode. If the storage medium 106 is a CF card supporting both the PIO mode and the DMA mode, the dedicated driver 554 is selected to enable the data transfer in the DMA mode. As the DMA mode has a higher data transfer rate and occupies less processor time than the PIO mode, the efficiency of the data transfer system 500 can be improved.

Figure 6:
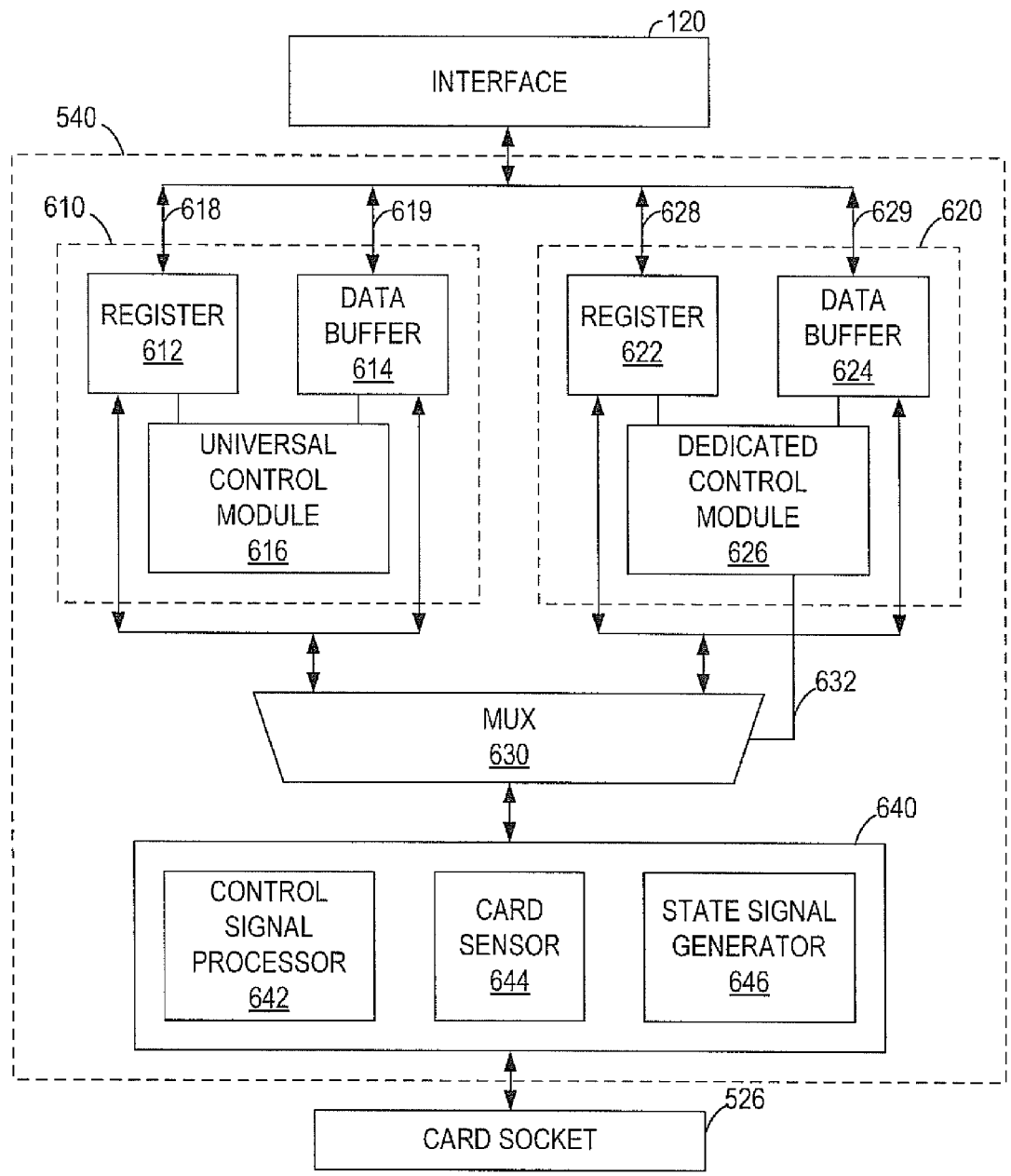
FIG. 6 illustrates a block diagram of a controller, in accordance with one embodiment of the present invention.

FIG. 6 illustrates a block diagram of the controller 540 and the interface 120, in accordance with one embodiment of the present invention. Elements labeled the same as in FIG. 1 and FIG. 5 have similar functions. FIG. 6 is described in combination with FIG. 5.

The interface 120 coupled to the host interface 566 is used for connecting the controller 540 to the host 102. In the example of FIG. 6, the controller 540 includes multiple cores such as a universal core 610 and a dedicated core 620, a multiplexer 630, and a logic module 640.

The multiple cores 610 and 620 are operable for establishing communications between the storage medium 106 and the multiple drivers. The universal core 610 is capable of establishing communications between the storage medium 106 and the universal driver 552. The dedicated core 620 is capable of establishing communications between the storage medium 106 and the dedicated driver 554. The multiplexer 630 is operable for selecting a selected core from the multiple cores. As different cores can communicate with different drivers, the multiplexer 630 can select a driver by selecting the corresponding core.

In one embodiment, the logic module 640 includes a control signal processor 642, a card sensor 644, and a state signal generator 646. The cores can transfer control signals to the logic module 640 according to the control information from the host 102. The control signal processor 642 analyzes the control signals, and reads or writes the corresponding data information accordingly. The card sensor 644 senses the state of the storage medium 106. For example, the card sensor 644 can monitor whether the storage medium 106 is plugged into the card socket 526 or removed from the card socket 526. The state signal generator 646 can generate multiple state signals indicating the state of the storage medium 106 based on the sensing operation of the card sensor 644 or the analyzing operation of the control signal processor 642. For example, when the card sensor 644 senses that the storage medium 106 is inserted, the state signal generator 646 can generate a card-insertion signal. Moreover, when the control signal processor 642 receives the select-universal-driver command, the state signal generator 646 can generate another card-insertion signal. The controller 540 can have other configurations, and is not limited to the example of FIG. 6.

In one embodiment, the universal core 610 includes a register 612, a data buffer 614, and a universal control module 616. The data buffer 614 is operable for buffering the data information. The register 612 is operable for storing the control information from the universal driver 552 and the state information from the storage medium 106. The universal control module 616 coupled to the register 612 and the data buffer 614 functions as a PIO controller. More specifically, the universal control module 616 can monitor the control information stored in the register 612 and can generate corresponding control signals to control the data transfer. For example, the universal control module 616 can send a read signal to the storage medium 106 in response to a read command transferred from the universal driver 552 to the register 612. The control signal processor 642 analyzes the read signal and reads the data information from the storage medium 106 to the data buffer 614. Therefore, the processor 564 can receive the data information by accessing the data buffer 614.

In addition, the universal control module 616 also monitors state information transferred from the storage medium 106 to the register 612 and can generate a corresponding state command. The processor 564 that executes the universal driver 552 can determine the following step of the data transfer according to the state command. For example, when the card sensor 644 detects that a storage space of the storage medium 106 is fully occupied during a write operation, the state signal generator 646 can send a space-full signal to the register 612. Accordingly, the universal control module 616 can generate a space-full command to inform the universal driver 552 that the storage medium 106 can not receive the data information any more. In response to the space-full command, the universal driver 552 generates a termination command to terminate the data transfer.

In one embodiment, the dedicated core 620 includes a register 622, a data buffer 624, and a dedicated control module 626. The register 622 and the data buffer 624 in the dedicated core 620 have similar functions as corresponding components in the universal core 610. The dedicated control module 626 coupled to the register 622 and the data buffer 624 functions as a DMA controller. For example, after the processor 564 executes the dedicated driver 554 to generate an initiation command, the dedicated driver 554 can enable the dedicated control module 626 to access the bus 562 and the memory 568 by itself. In a write operation, the dedicated control module 626 reads the data information from the memory 568 to the data buffer 624, and transfers the data information from the data buffer 624 to the storage medium 106. In a read operation, the dedicated control module 626 reads the data information from the storage medium 106 to the data buffer 624, and transfers the data information from the data buffer 624 to the memory 568. Moreover, the dedicated control module 626 can monitor the state information in the register 622, and can determine the following step of the data transfer. For example, when the register 622 receives the space-full signal, the dedicated control module 626 terminates the data transfer without generating any state commands to be accessed by the processor 564.

In one embodiment, the register 622 further stores a data set including core-selection data, driver-valid data, and need-driver-control data. Alternatively, the data set can be stored in another storage medium coupled to the multiplexer 630, e.g., the register 612 in the universal core 610 or a storage medium outside the cores 610 and 620. In one embodiment, all the core-selection data, the driver-valid data, and the need-driver-control data can be one bit data having two values, e.g., digital one and digital zero. The multiplexer 630 can select the selected core according to the data set stored in the register 622. More specifically, the dedicated control module 626 can monitor the data set stored in the register 622 and can generate a core-selection signal 632. Accordingly, the multiplexer 630 can select a corresponding core from the multiple cores to communicate with a corresponding driver. As such, the corresponding driver is selected, and the controller 540 can operate in a corresponding operation mode to transfer the data information according to the selected driver.

The core-selection data indicates compatibility between the dedicated driver 554 and the type of the storage medium 106 (FIG. 5). In one embodiment, the dedicated control module 626 can set the core-selection data to a default value, e.g., digital one, to indicate a default selection of the dedicated driver 554 if the storage medium 106 is removed. Thus, during a subsequent insertion of the storage medium 106, the multiplexer 630 can select the dedicated driver 554 according to the default value of the core-selection data. As such, the dedicated driver 554 can be executed by the processor 564 to identify the storage medium 106, and can determine the compatibility between the dedicated driver 554 and the type of the storage medium 106 accordingly.

As described in relation to FIG. 5, the dedicated driver 554 determines whether the DMA mode associated with the dedicated driver 554 is compatible with the type of the storage medium 106. If the DMA mode is compatible with the storage medium 106, the core-selection data is set to a first value, e.g., digital one. Based on the first value of the core-selection data, the multiplexer 630 selects the dedicated driver 554. If the DMA mode is incompatible with the storage medium 106, the dedicated driver 554 generates the select-universal-driver command. In response to the select-universal-driver command, the dedicated control module 626 sets the core-selection data to a second value, e.g., digital zero. Based on the second value of the core-selection data, the multiplexer 630 selects the universal core 610 to communicate with the universal driver 552. Thus, the universal driver 552 is selected to enable the controller 540 to operate in the PIO mode.

In one embodiment, the dedicated driver 554 may be uninstalled or invalidated by users. Then, the multiplexer 630 is needed to select the universal driver 552 and the universal core 610. The driver-valid data indicates availability of the dedicated driver 554. For example, when the dedicated driver 554 is installed into the host 102, the dedicated control module 626 sets the driver-valid data to a first value, e.g., digital one, to indicate that the dedicated driver 554 is available. When the dedicated driver 554 is uninstalled from the host 102 or disabled by users, the dedicated control module 626 sets the driver-valid data to a second value, e.g., digital zero, to indicate that the dedicated driver 554 is unavailable.

The multiplexer 630 can select the driver according to the driver-valid data. If the driver-valid data indicates that the dedicated driver 554 is available, the multiplexer 630 determines the selection of the cores according to the core-selection data as mentioned herein above. Advantageously, if the driver-valid data indicates that the dedicated driver 554 is unavailable, the multiplexer 630 selects the universal driver 552 automatically, whether the core-selection data is digital one or not. Therefore, termination of the data transfer system 500 caused by absence of the dedicated driver 554 can be avoided, which can improve the stability of the data transfer system 500.

In one embodiment, the dedicated driver 554 may be installed or validated by the user when the universal driver 552 and the universal core 610 are transferring the data information. At that moment, the dedicated driver 554 may not be needed to handle the data transfer. The need-driver-control data indicates whether the data transfer is established by the universal driver 552 and the universal core 610 or the dedicated driver 554 and the dedicated core 620.

In one embodiment, the dedicated control module 626 can determine the need-driver-control data according to the core-selection data and the driver-valid data. More specifically, when the card sensor 644 finds that the storage medium 106 is inserted, or the control signal processor 642 receives the select-universal-driver command, the state signal generator 646 generates the card-insertion signal. In response to the card-insertion signal, the dedicated control module 626 implements a logic AND operation on the core-selection data and the driver-valid data and determines the need-driver-control data accordingly. For example, if the core-selection data is digital zero (e.g., indicating the dedicated driver 554 is incompatible with the storage medium 106) or the driver-valid data is digital zero (e.g., indicating the dedicated driver 554 is unavailable), the dedicated control module 626 sets the need-driver-control data to a first value, e.g., digital zero, to indicate the universal driver 552 and the universal core 610 are transferring data information. Otherwise, the need-driver-control data is set to a second value, e.g., digital one, to indicate the dedicated driver 554 and the dedicated core 620 are transferring data information.

Advantageously, although the driver-valid data can be set to digital one when the dedicated driver 554 is installed or validated by the user, the multiplexer 630 and the dedicated driver 554 can check the need-driver-control data. If the need-driver-control data indicates the universal driver 552 and the universal core 610 are transferring the data information, the dedicated driver 554 can stop working. Moreover, the multiplexer 630 can select the universal driver 552 and the universal core 610 according to the need-driver-control data irrespective of the core-selection data and the driver-valid data.

As such, termination of the data transfer system 500 caused by any contradictions between the universal driver 552 and the dedicated driver 554 can be avoided, which can improve the stability of the data transfer system 500.

In conclusion, based on the core-selection data, the driver-valid data, and the need-driver-control data, the universal driver 552 and the dedicated driver 554 can be properly selected in various kinds of conditions. As such, the stability of the data transfer system 500 can be improved.

Figure 7:
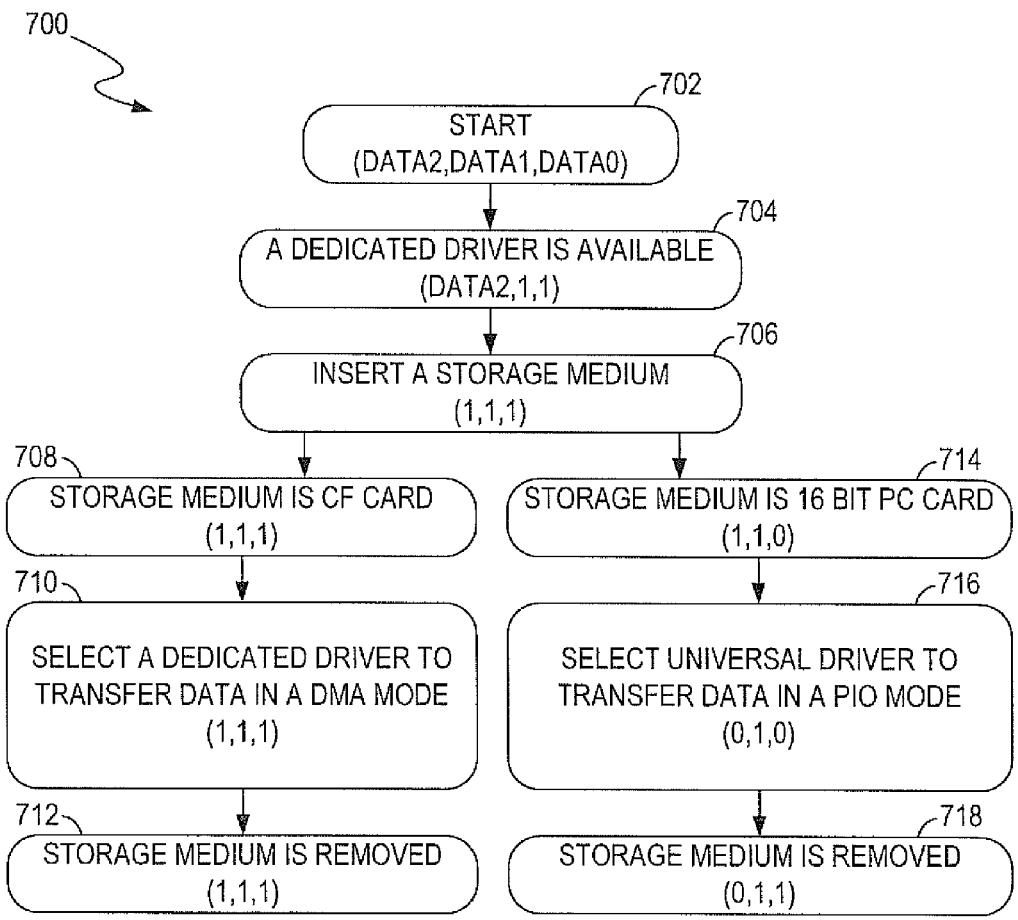
FIG. 7 illustrates a flowchart of operations performed by a data transfer system, in accordance with one embodiment of the present invention.

FIG. 7 illustrates a flowchart 700 of operations performed by the data transfer system 500 when the dedicated driver 554 is available, in accordance with one embodiment of the present invention. FIG. 7 is described in combination with FIG. 5 and FIG. 6. In the example of FIG. 7, the flowchart 700 shows DATA0, DATA1, and DATA2. DATA0 represents the core-selection data, DATA1 represents the driver-valid data, and DATA2 represents the need-driver-control data.

At step 702, the data transfer system 500 is started. The processor 564 loads multiple programs according to the service-group-order file of the registry provided by the operating system. At step 704, the dedicated driver 554 has been installed and is set to be valid, e.g., by users. As such, DATA1 is set to digital one indicating that the dedicated driver 554 is available. DATA0 is set to the default value, e.g., digital one, when the storage medium 106 is removed after a previous insertion of the storage medium 106.

At step 706, the storage medium 106 is inserted into the card socket 526 of the controller 540. The multiplexer 630 selects the dedicated driver 554 by default according to DATA0 (the core-selection data). The card sensor 644 senses the card insertion and enables the state signal generator 646 to send a card-insertion signal to the dedicated core 620. In response to the card-insertion signal, the dedicated core 620 determines DATA2 by implementing a logic AND operation on DATA1 and DATA0. Thus, DATA2 is set to digital one. The dedicated driver 554 identifies the type of storage medium 106 according to the identification information of the storage medium 106 and determines the core-selection data accordingly.

At step 708, the storage medium 106 may be a CF card supporting the DMA mode associated with the dedicated driver 554. Therefore, DATA0, e.g., the core-selection data, remains digital one. At step 710, the multiplexer 630 selects the dedicated driver 554 according to the values of DATA0, DATA1, and DATA2 to transfer the data information in the DMA mode. At step 712, the storage medium 106 is removed. DATA0 is set to the default value, e.g., DATA0 remains digital one.

At step 714, the storage medium 106 may be a 16 bit PC card which does not support the DMA mode. Therefore, the dedicated driver 554 generates a select-universal-driver command to set DATA0 to the second value, e.g., digital zero, and to enable the logic module 640 to generate another card-insertion signal. At step 716, the multiplexer 630 selects the universal driver 552 according to DATA0 (e.g., the core-selection data). Additionally, in response to the card-insertion signal, the dedicated control module 626 implements the logic AND operation on DATA0 and DATA1 to obtain DATA2. Thus, DATA2 (e.g., the need-driver-control data) is set to digital zero to indicate the universal driver 552 and the universal core 610 are transferring the data information. At step 718, the storage medium 106 is removed, and DATA0 is set to the default value such as digital one.

Figure 8:
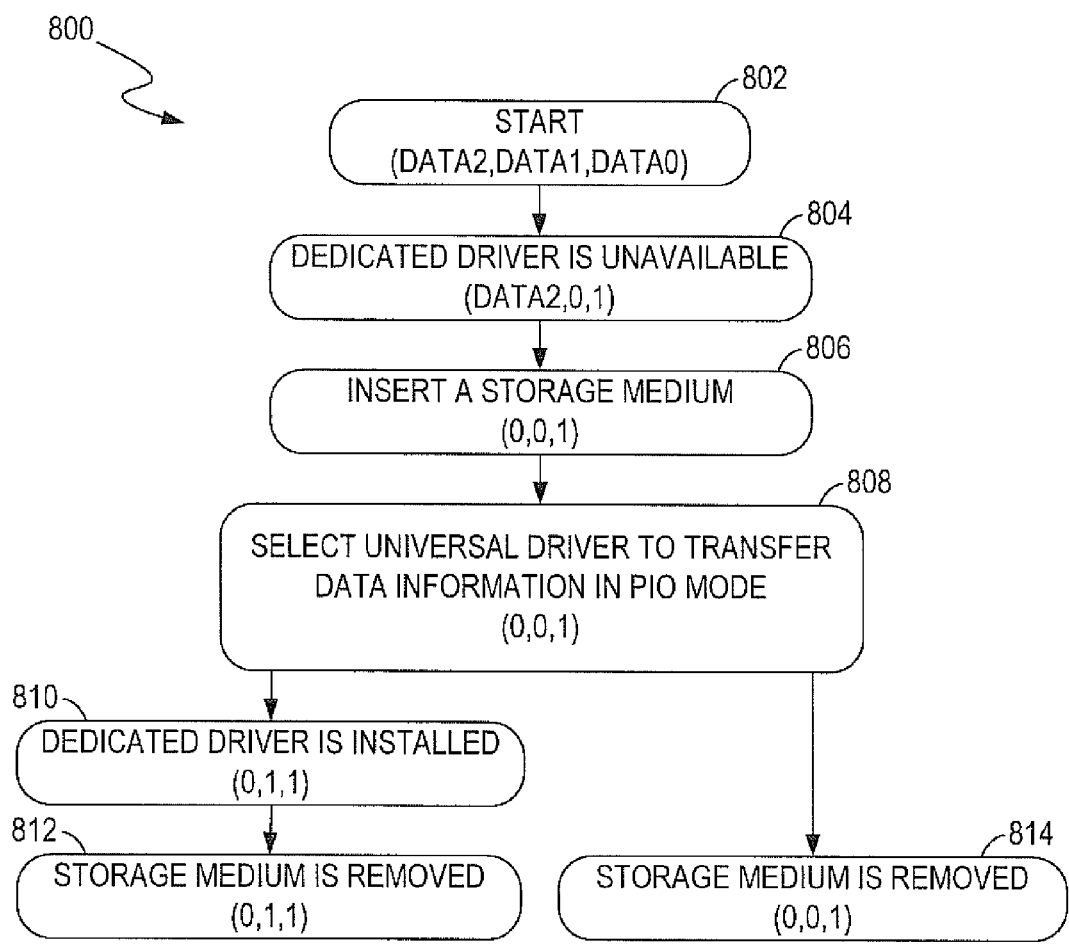
FIG. 8 illustrates another flowchart of operations performed by a data transfer system, in accordance with one embodiment of the present invention.

FIG. 8 illustrates another flowchart 800 of operations performed by the data transfer system 500 when the dedicated driver 554 is unavailable, in accordance with one embodiment of the present invention. FIG. 8 is described in combination with FIG. 5 and FIG. 6. In the example of FIG. 8, the flowchart 800 shows DATA0, DATA1, and DATA2. DATA0 represents the core-selection data, DATA1 represents the driver-valid data, and DATA2 represents the need-driver-control data.

At step 802, the data transfer system 500 is started. The processor 564 loads multiple programs according to the service-group-order file of the registry provided by the operating system. At step 804, the dedicated driver 554 is uninstalled or invalidated by users. As such, DATA1 (e.g., the driver-valid data) is set to digital zero indicating that the dedicated driver 554 is unavailable.

At step 806, the storage medium 106 is inserted. The state signal generator 646 generates a card-insertion signal. The dedicated control module 626 determines DATA2 by implementing the logic AND operation on DATA1 and DATA0 in response to the card-insertion signal. Thus, DATA2 is reset to digital zero to indicate the data transfer is established by the universal driver 552 and universal core 610. At step 808, the multiplexer 630 selects the universal driver 552 and the universal core 610 according to DATA1, although DATA0 has the default value, e.g., digital one. At step 814, the storage medium 106 is removed. DATA0 continues to have the default value such as digital one.

At step 810, the dedicated driver 554 is installed. DATA1 is set to digital one to indicate that the dedicated driver 554 has become available. Based on DATA2 (e.g., the need-driver-control data), the multiplexer 630 continues to select the universal driver 552. In addition, the dedicated driver 554 will stop operating. At step 812, the storage medium 106 is removed. DATA0 continues to have the default value such as digital one. The data transfer system 500 can have other operations, and is not limited to the examples of FIG. 7 and FIG. 8.

Figure 9:
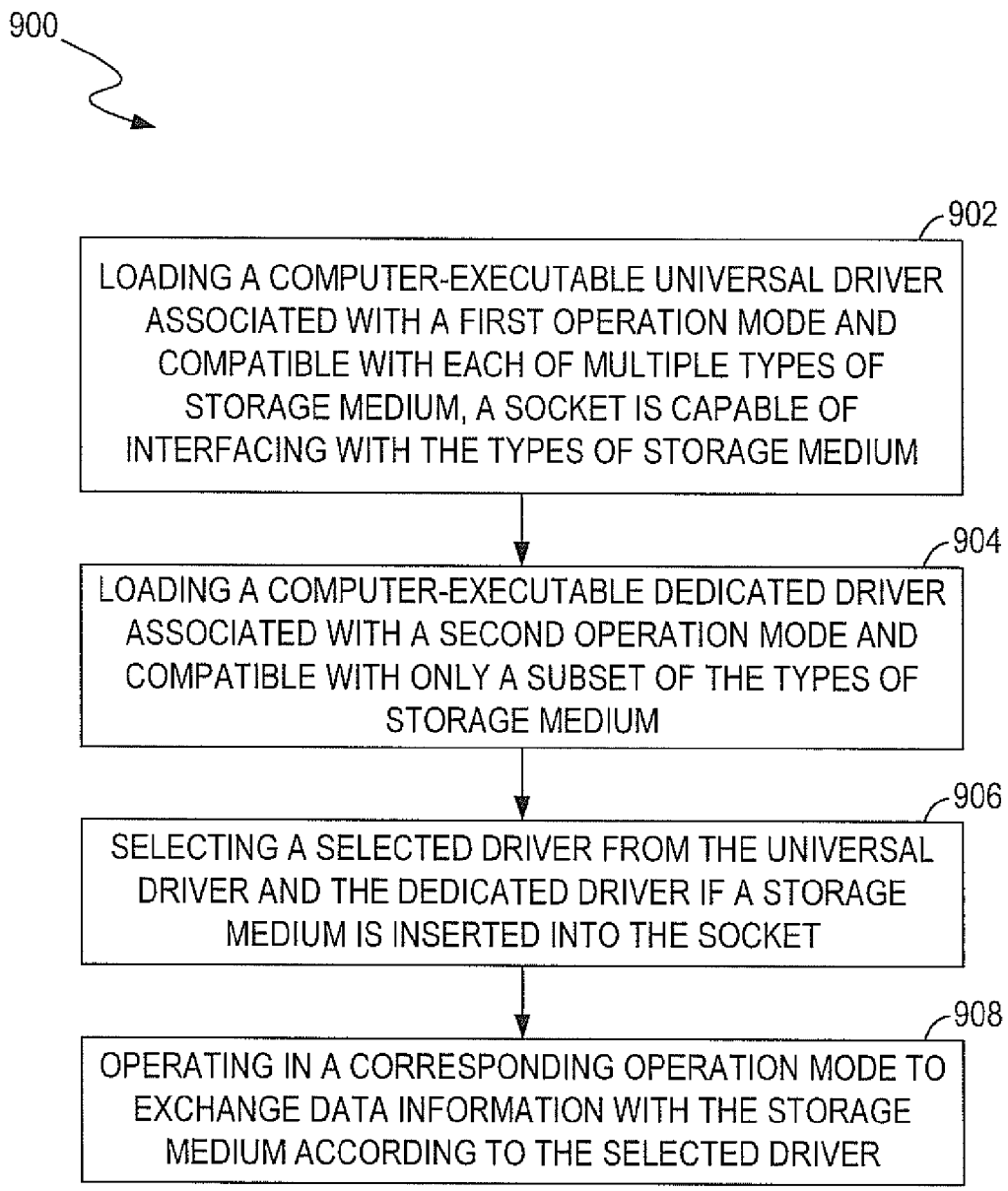
FIG. 9 illustrates another flowchart of operations performed by a data transfer system, in accordance with one embodiment of the present invention.

FIG. 9 illustrates a flowchart 900 of operations performed by a data transfer system, e.g., the data transfer system 500, in accordance with one embodiment of the present invention. FIG. 9 is described in combination with FIG. 5-FIG. 8. Although specific steps are disclosed in FIG. 9, such steps are examples. That is, the present invention is well suited to performing various other steps or variations of the steps recited in FIG. 9. In one embodiment, the flowchart 900 can be implemented as computer-executable instructions stored in a computer-readable medium.

In block 902, a computer-executable universal driver, e.g., the universal driver 552, is loaded. The universal driver is associated with a first operation mode, e.g., the PIO mode, and compatible with each of multiple types of storage medium, e.g., the 16 bit PC card and the CF card. A socket, e.g., the universal card socket 526, is capable of interfacing with the types of storage medium.

In block 904, a computer-executable dedicated driver, e.g., the dedicated driver 554, is loaded. The dedicated driver is associated with a second operation mode, e.g., the DMA mode, and compatible with only a subset of the types of the storage medium, e.g., the CF card. In one embodiment, the dedicated driver is loaded before loading the universal driver.

In block 906, a selected driver is selected if a storage medium, e.g., the storage medium 106, is inserted into the socket. The selected driver includes the dedicated driver if the storage medium is a member of the subset and otherwise the selected driver includes the universal driver. In one embodiment, core-selection data indicating whether the dedicated driver is compatible with the storage medium is accessed, and the selected driver is selected according to the core-selection data. The core-selection data is set to a default value, and the dedicated driver is selected by default when the storage medium is inserted to the socket according to the default value. Subsequently, a type of the storage medium is identified based on identification information contained in the storage medium, and the core-selection data is determined according to the type. Moreover, driver-valid data indicating availability of the dedicated driver is accessed, and the selected driver is selected according to the driver-valid data. Furthermore, need-driver-control data indicating whether the universal driver is transferring the data information is accessed, and the selected driver is selected according to the need-driver-control data.

In block 908, operation proceeds in a corresponding operation mode to exchange data information with the storage medium.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. An apparatus comprising:
   a socket capable of interfacing with different types of storage medium;
   a computer-readable medium operable for storing a computer-executable universal driver associated with a first operation mode and compatible with each of said types of storage medium, and for storing a computer-executable dedicated driver associated with a second operation mode and compatible with only a subset of said types of storage medium: and
   a controller coupled to said computer-readable medium and coupled to said socket, and operable for selecting a selected driver from said universal driver and said dedicated driver if a storage medium is inserted into said socket and for operating in a corresponding operation mode to exchange data information with said storage medium according to said selected driver, wherein said selected driver comprises said dedicated driver if said storage medium is a member of said subset and wherein otherwise said selected driver comprises said universal driver, wherein said controller comprises:
      a register that stores need-driver-control data having either a first value indicating that said universal driver is selected or a second value indicating that said dedicated driver is selected, wherein said controller selects said universal driver to transfer said data information in said first operation mode and sets said need-driver-control data to said first value if said dedicated driver is unavailable, and wherein said controller continues to select said universal driver instead of said dedicated driver according to said need-drive-control data when said dedicated driver becomes available.

2. The apparatus as claimed in claim 1 wherein said first operation mode comprises a programmed input and output (PIO) mode, and wherein said second operation mode comprises a direct memory access (DMA) mode.

3. The apparatus as claimed in claim 1, wherein said controller comprises:
   a universal core operable for establishing communications between said storage medium and said universal driver;
   a dedicated core operable for establishing communications between said storage medium and said dedicated driver; and
   a multiplexer coupled to said universal core and said dedicated core and operable for selecting said selected driver by selecting a corresponding core from at least said universal core and said dedicated core.

4. The apparatus as claimed in claim 1, wherein said said register further stores:
   core-selection data indicating whether said dedicated driver is compatible with said storage medium and driver-valid data indicating availability of said dedicated driver,
   wherein said controller selects said selected driver according to said core-selection data, said driver-valid data and said need-driver-cont data.

5. The apparatus as claimed in claim 4, wherein said core-selection data assumes a default value when said storage medium is inserted into said socket, and wherein said multiplexer selects said dedicated driver by default according to said default value.

6. The apparatus as claimed in claim 5, wherein said dedicated driver is executable to identify a type of said storage medium based on identification information contained in said storage medium and to determine said core-selection data according to said type.

7. The apparatus as claimed in 4, wherein said need-driver-control data is calculated according to said core-selection data and said driver-valid data.

8. The apparatus as claimed in claim 4, wherein said core-selection data has a third value if said type of said storage medium belongs to said subset, otherwise said core-selection data has, a fourth value, and wherein said driver-valid data has a fifth value if said dedicated driver is available and has a sixth value if said dedicated driver is unavailable.

9. The apparatus as claimed in claim 8, wherein said controller sets said need-driver-control data to said first value if said core-selection data has said fourth value and sets said need-driver-control data to said first value if said driver-valid data has said sixth value.

10. The apparatus as claimed in claim 8, wherein said controller sets said need-driver-control data when said storage medium is inserted into said socket, and wherein said controller remains said need-driver-control data even if said driver-valid data is changed to said fifth value when said dedicated driver becomes available.

11. The apparatus as claimed in claim 8, wherein said controller selects said universal driver if said need-driver-control data has said first value for any values of said core-selection data and said driver-valid data.

12. The apparatus as claimed in claim 8, wherein said controller selects said selected driver according to said core-selection data if said need-driver-control data has said second value, and wherein said controller selects said dedicated driver if said core-selection data has said third value and selects said universal driver if said core-selection data has said fourth value.

13. A method comprising:
   loading a computer-executable universal driver associated with a first operation mode and compatible with each of a plurality of types of storage medium, wherein a socket is capable, of interfacing with said types of storage medium;

loading a computer-executable dedicated driver associated with a second operation mode and compatible with only a subset of said types of storage medium;

selecting a selected driver from said universal driver and said dedicated driver is said storage medium is inserted into said socket;

operating in a corresponding operation mode to exchange said data information with said storage medium according to said selected driver, wherein said selected driver comprises said dedicated driver if said storage medium is a member of said subset and wherein otherwise said selected driver comprises said universal driver;

selecting said universal driver to transfer said data information in said first operation mode if said dedicated driver is unavailable;

setting need-driver-control data to a first value indicating that said universal driver is selected;

checking said need-driver-control data if said dedicated driver becomes available; and selecting said universal driver if said need-driver-control data has said first value although said dedicated driver is available.

14. The method as claimed in claim 13, wherein said selecting further comprises:

accessing core-selection data indicating whether said dedicated driver is compatible with said storage medium;

accessing driver-valid data indicating availability of said dedicated driver; and selecting said selected driver according to said core-selection data, said driver-valid data, and said need-driver-control data.

15. The method as claimed in claim 14, wherein said selecting further comprises:

setting said core-selection data to a default value; and selecting said dedicated driver by default when said storage medium is inserted to said socket according to said default value.

16. The method as claimed in cam 15, further comprising:

identifying a type of said storage medium based on identification information contained in said storage medium: and determining said core-selection data according to said type.

17. The method as claimed in claim 14, further comprising:

setting said core-selection data to a third value if the type of said storage medium belongs to said subset;

setting said core-selection data to a fourth value he type of said storage medium does not belong to said subset;

setting said driver-valid data to a fifth value if said dedicated driver is available; and setting said driver-valid data to a sixth value if said dedicated driver is unavailable.

18. The method as claimed in claim 17, further comprising:
setting said need-driver-control data to said first value if said core-selection data has said fourth value or it said driver-valid data has said sixth value.

19. The method as claimed in claim 17, further comprising:
setting said need-driver-control data when said storage medium is inserted into said socket; and
maintaining said need-driver-control data until said storage medium is removed from said socket even if said driver-valid data is changed to said fifth value when said dedicated driver becomes available.

20. The method as claimed in claim 17, further comprising:
selecting said universal driver if said need-driver-control data has said first value irrespective of what values said core-selection data and said driver-valid data have.

21. The method as claimed in claim 17, further comprising:
selecting said dedicated driver if said need-driver-control data has said second value, said driver-valid data has said fifth value, and said core-selection data has said third value; and
selecting said universal driver if said need-driver-control data has said second value, said driver-valid data has said fifth value, and said core-selection data has said fourth value.

22. A controller coupled to a socket and for transferring data information between a host and said socket, said socket capable of interfacing with a plurality of types of storage medium, said controller comprising:

a universal core capable of operating in a first operation mode to transfer said data information according to control commands from a computer-executable universal driver, said first operation mode compatible with each of said types of storage medium;

a dedicated core capable of operating in a second operation mode to transfer said data information according to control commands from a computer-executable dedicated driver, said second operation mode compatible with only a subset of said types of storage medium;

a multiplexer coupled to said universal core and said dedicated core and operable for selecting a selected core from said universal core and said dedicated, core to transfer said data information, wherein said selected core comprises said dedicated core if said storage medium is a member of said subset and wherein otherwise said selected core comprises said universal core; and a register that stores a data set, wherein said multiplexer selects said selected core according to said data set, and wherein said data set comprises need-driver-control data having either a first value indicating that said universal core is selected or a second value indicating that said dedicated core is selected, wherein said multiplexer selects said universal core to transfer said data information in said first operation mode and sets said need-driver-control data to said first value if said dedicated driver associated with said first operation mode is unavailable, wherein said multiplexer continues to select said universal core according to said need-driver-control data when said dedicated driver becomes available.

23. The controller as claimed in claim 22, wherein said data comprises core-selection data indicating whether said dedicated driver is compatible with said storage medium, wherein said data set further comprises driver-valid data indicating availability of said dedicated driver, and wherein said need-driver-control data is calculated according to said core-selection data and said driver-valid data.

24. The controller as claimed in claim 23, wherein said core-selection data assumes a default value to enable said multiplexer to select said dedicated core by default during an insertion of said storage medium, and wherein said dedicated driver is capable of identifying a type of said storage medium and determining said core-selection data according to said type.

25. The controller as claimed in claim 23, wherein said multiplexer selects said selected core according to said core-selection data if said need-driver-control data has said second value.

26. The controller as claimed in claim 23, wherein said multiplexer selects said universal core irrespective of said core-selection data and said driver-valid data if said need-driver-control data has said first value.

27. The controller as claimed in claim 23, wherein said controller sets said need-driver-control data to said first value if the type of said storage medium does not belong to, said subset and sets said need-driver-control data to said first value if said dedicated driver is unavailable, wherein otherwise said controller sets said need-driver-control data to said second value.

* * * * *